Nov. 8, 1966  C. P. ROBINSON  3,283,914
CONVEYOR LOCK-BAR-TROLLEY
Filed Aug. 12, 1964  2 Sheets-Sheet 1
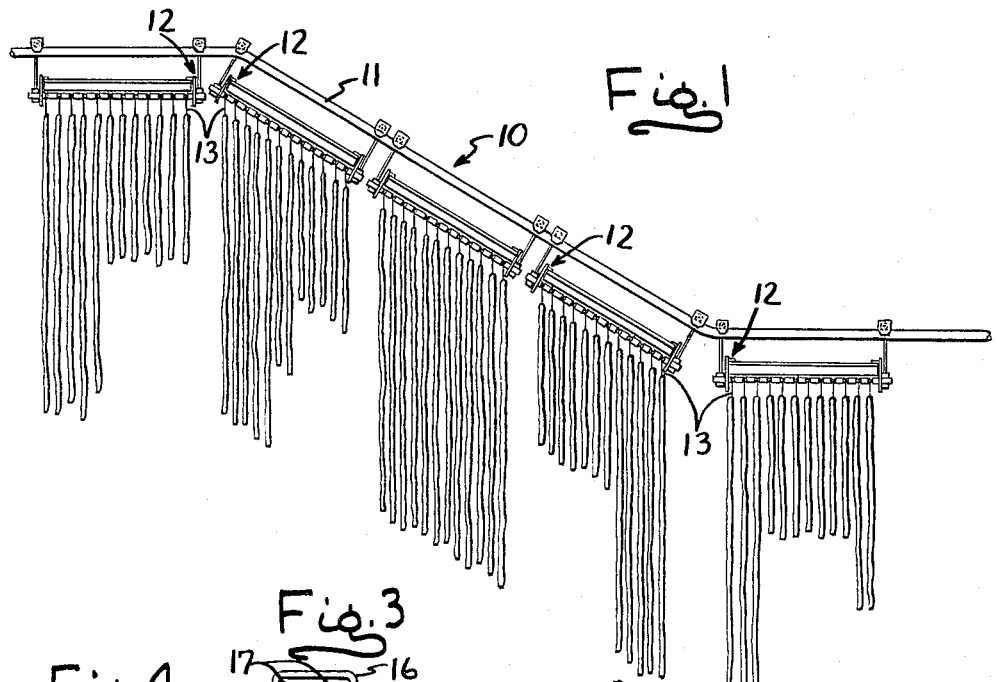
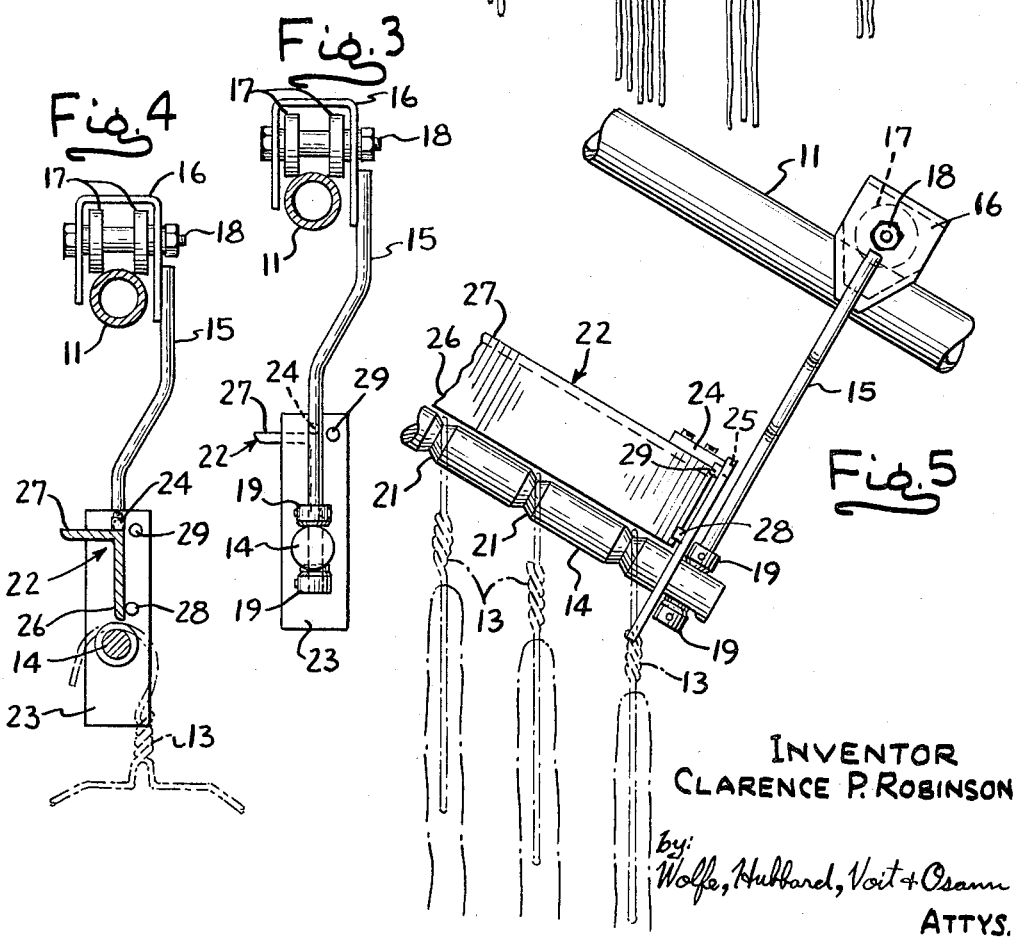
INVENTOR
CLARENCE P. ROBINSON
by: Wolfe, Hubbard, Voit & Osann
ATTYS.

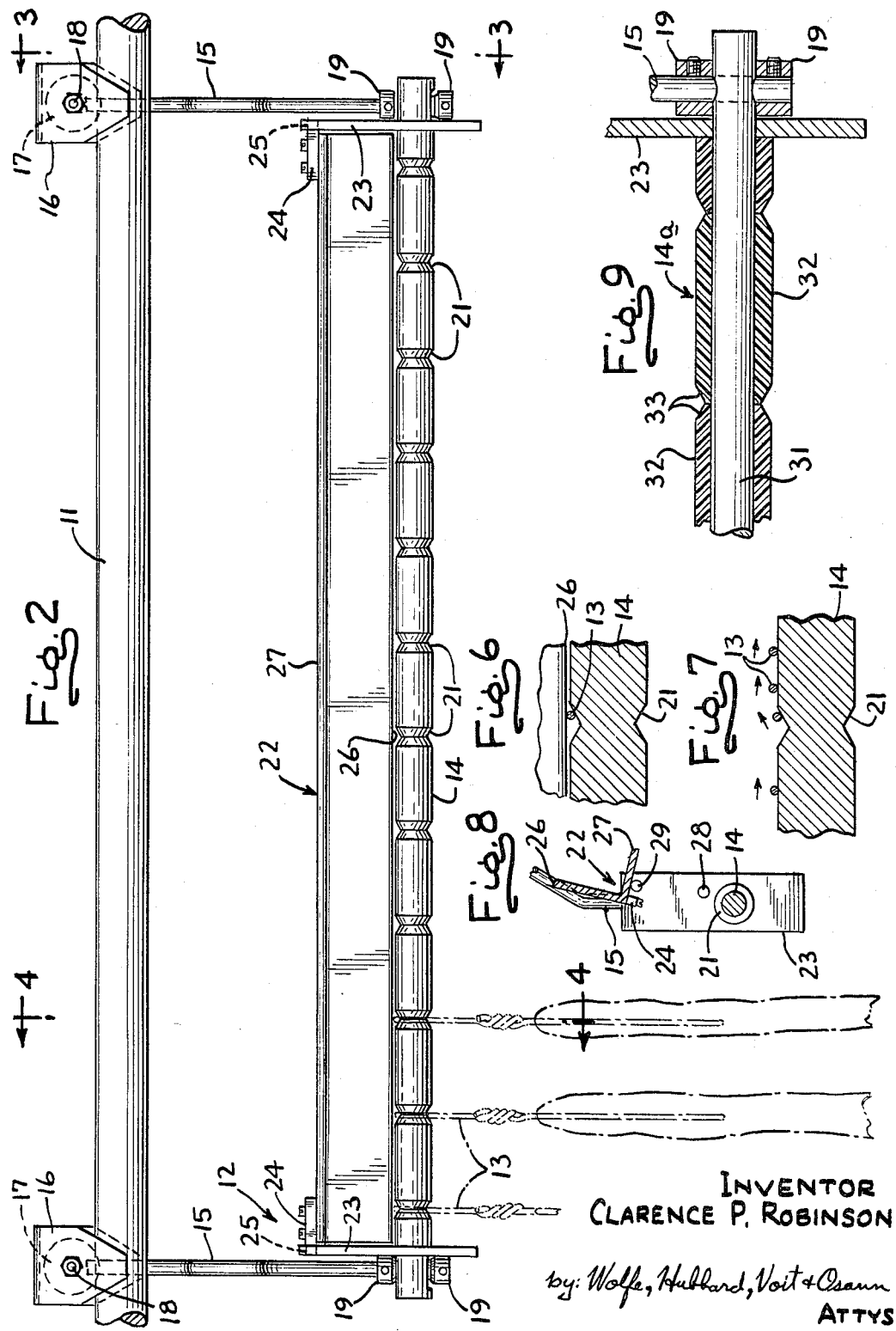

United States Patent Office 3,283,914
Patented Nov. 8, 1966

3,283,914
CONVEYOR LOCK-BAR-TROLLEY
Clarence P. Robinson, 723 Wellner Road,
Naperville, Ill.
Filed Aug. 12, 1964, Ser. No. 389,028
2 Claims. (Cl. 211—123)

The present invention relates generally to conveyor systems and more particularly concerns a novel bar-type trolley arrangement for carrying a plurality of hanging articles along a conveyor rail structure.

In recent years, there as been a tremendous growth in the adoption and utilization of mechanized material handling systems for a wide variety of applications. These systems typically provide a conveyor for moving material or articles from one place to another. When the articles to be transported are adapted to be hung from a portion of the conveyor, a monorail type conveyor track with movable trolleys suspended from the rail structure typically provides a very useful conveyor arrangement. Conveyor systems of this type have, for example, found wide acceptance and application in both garment manufacturing and cleaning establishments.

A typical conveyor system for an establishment of this type ordinarily includes one or more closed loop monorail supporting structures, each of which has a plurality of depending trolley bars movably mounted thereon. Ordinarily, suitable drive arrangements and operating controls are also provided for each conveyor loop to selectively transport the trolley bars along the monorail structure. Frequently, it is also necessary or desirable to arrange the conveyor system so that the trolley bars are moved up and down opposite paths that are inclined substantially from the horizontal. Moving garments from a first floor receiving area to a second floor processing area and returning them back to the first floor for delivery is one exemplary situation.

It will be appreciated that many different types of monorail supporting structures have been developed for use in systems of the above general type. Thus, some systems use I-beam rails, channel-like rails, or simple tubular rails on which the trolley rollers are externally mounted; while other systems employ box-like rails which enclose the trolley rollers. Similarly, various trolley bar configurations and roller mounting arrangements have also been devised. Basically, however, the trolley bars per se fall into two general categories. One general type simply employs a relatively smooth rod or bar supported adjacent its opposite ends from the rail structure by a pair of roller pendants. The other general type, while it takes many forms, ordinarily utilizes a member having spaced apertures along its length in place of the smooth bar of the other system.

Each of the two above types of trolley bar arrangements has certain advantages and disadvantages. The smooth rod type trolley bar, for example, permits a plurality of garment hangers to be placed on the trolley bar at a generally centered position and then the individual hanger hooks spread along the length of the trolley bar in opposite directions so that the garments are suspended along the length of the bar. When the garments are taken off the trolley bar of this type, of course, the hangers may be quicky and conveniently consolidated adjacent the center of the trolley car and lifted from the bar by the operator. The principal disadvantage of this bar, however, is that the hangers and the garments tend to consolidate toward one end of the bar as it starts and stops or as it moves up or down a substantial incline. This is naturally undesirable since the garments tend to become wrinkled and do not air properly. The apertured trolley bar, on the other hand, does not permit the hangers to consolidate at one end when the trolley bar starts and stops or moves along an incline. By the same token, however, the hangers cannot be consolidated when they are placed on or taken off the trolley bar. Rather, each hanger must be individually inserted into one of the spaced apart apertures.

Accordingly, it is the primary aim of the present invention to provide an improved bar-type trolley arrangement adapted to support a plurality of material holding hooks for movement along a horizontal or inclined conveyor structure which permits the hooks to be quickly and easily placed onto the trolley bar singly or in a consolidated group and then spread into uniformly spaced locations along the trolley bar.

Another object of the invention is to provide such a trolley bar having locking means designed to permit spreading of the suspended articles along the trolley bar for handling on inspection without removal or to permit instant single or consolidated removal of the articles from the trolley bar, and yet to prevent the undesirable consolidation of the hanging articles at one end of the trolley bar as it starts and stops or moves along a horizontal of inclined path.

It is a more particular object of the present invention to provide an improved trolley bar of the above type having a plurality of spaced apart depressions formed in the surface of the bar for receiving a plurality of individual hooks and having a latch member selectively movable between alternate positions for retaining the hooks within the depressions or to permit instant easy spreading of the hooks, holding suspended articles, for convenient inspection or handling of the articles while the hooks remain on the trolley bar and to permit easy removal of the hooks from the trolley bar.

It is a more specific object to provide a trolley bar of the above type wherein the latch member is eccentrically mounted over the trolley bar so that the overhanging weight of the latch member insures that it will remain in either of its alternate positions until it is manually or mechanically moved.

Other objects and advantages of the invention will become more readily apparent upon reading the following detailed description and upon reference to the drawings in which:

FIGURE 1 is a fragmentary side elevation of a portion of a monorail supporting structure on which a plurality of the improved hanger bars of the present invention are mounted.

FIG. 2 is a greatly enlarged side elevation of one of the novel trolley bars of the present invention.

FIG. 3 is an end view of the trolley bar as seen substantially in the plane of line 3—3 in FIG. 2.

FIG. 4 is a sectional view taken substantially in the plane of line 4—4 in FIG. 2.

FIG. 5 is an enlarged fragmentary side elevational view of one of the inclined trolley bars as seen in FIG. 1.

FIG. 6 is a fragmentary longitudinal section on enlarged scale showing the cooperation between the lock means and the body of one of the novel trolley bars.

FIG. 7 is a view similar to FIG. 6 but with the lock means in its upraised position to illustrate the axial movement of a plurality of the hanger hooks along the trolley bar.

FIG. 8 is a fragmentary section similar to FIG. 4 showing the lock means in its upraised position; and FIG. 9 is a fragmentary sectional view of a modification of one of the trolley bars.

While the invention will be described in connection with certain preferred embodiments, it will be understood that I do not intend to limit the invention to the illustrated embodiments. On the contrary, I intend to cover all alternatives, modifications and equivalents as may be included within the spirit and scope of the invention as defined by the appended claims.

Turning now to the drawings, there is shown a monorail conveyor system 10 of the type having particular utility in the garment industry. The conveyor system 10 includes a single supporting rail 11 which mounts a plurality of trolley bars 12 constructed in accordance with the present invention. Each of the trolley bars 12 in turn suspends a plurality of garment hangers 13 on which suits, dresses or the like may be hung. In the illustrative conveyor system 10, the rail 11 has been illustrated with a generally circular cross section. It will be understood, however, that rails having other shapes may also be employed without departing from the present invention. It will also be understood that the rail 11 is suitably suspended from the ceiling or wall of the building in which it is used by means which are not important to the practice of the present invention and the details of which have not been shown. Suffice it to say that the rail 11 ordinarily forms a closed loop and suitable driving and control mechanisms are provided for at least a portion of the loop for moving the trolley bars 12 along the rail structure while other portions of the system may be arranged to permit manual or free movement of the trolley bars. As shown in FIG. 1, the conveyor system 10 may include some rail portions disposed generally horizontally and other rail portions that are inclined substantially from the horizontal. Such an arrangement, of course, would be typical when garments are moved from one floor to another in a garment establishment.

As best seen in FIG. 2, each of the trolley bars 12 includes an elongated body member 14 supported from the rail 11 by means of an end pendant 15 secured adjacent each end of the body member 14. The upper end of each end pendant 15 mounts a saddle 16 in which rollers 17 are journalled about an axle 18 for movement along the rail 11. As seen in FIGS. 3 and 4, the lower end of each of the pendants 15 is offset from the upper end in order to suspend the body 14 of the trolley bar directly below the rail 11. The pendants 15 may be secured to the body 14 in any suitable manner, as for example, by removable collars 19 as shown in the drawings.

In accordance with the present invention, the body 14 of the trolley bar 12 is formed with a plurality of depressions 21 for receiving the garment hanger hooks or material holding hooks 13. In the illustrated embodiment, the body member 14 is generally circular in cross section and the depressions 21 are generally V-shaped circumferential grooves axially spaced along the length of the body 14. It will be understood that the number of grooves 21 formed in the body 14 is dependent upon the length of the trolley bar 12 and the desired spacing of the hangers 13. As illustrated in FIGS. 1 and 2, the body 14 is formed with twelve depressions 21 which permits a dozen hangers to be suspended from each trolley bar 12.

In further accordance with the present invention, the novel trolley bar 12 is provided with latch means for retaining the hangers 13 in the spaced apart grooves 21 so that the garments do not tend to slide toward one end of the trolley bar as it starts and stops or moves along an incline or a horizontal path as shown in FIG. 1. To this end, a latch bar 22 is pivotally mounted above the body member 14 by means of end brackets 23 which extend upwardly from the body member. In the illustrative embodiment, the latch bar 22 is formed with a generally L-shaped cross section with two edge portions which intersect at substantially right angles. A pivot pin 24 is secured to each end of the latch bar adjacent the intersection of the edge members with the outer end of each pivot pin 24 journalled in a suitable aperture 25 formed in the bracket 23. The pivot pins 24 thus provide an eccentric pivotal mounting for the latch bar 22 which is disposed generally parallel to the body member 14.

To retain the hangers 13 in the depressions 21, the lock bar 22 is swung to its lowered position (see FIGS. 2–6) whereby one edge portion 26 of the latch bar is disposed close to the surface of the body member 14 to captivate the hangers 13 in the depressions 21. When the latch bar 22 is in its lowered position, the hangers 13 are prevented from slipping out of the depression 21 as the trolley bar 12 moves along an incline as shown in the fragmentary illustration of FIG. 5. In other words, the clearance provided between the edge 26 of the latch bar 22 and the surface of the body 14 is less than the diameter of the hangers 13 as shown in FIG. 6.

To spread or to remove the hangers 13 from the trolley bar 12, the latch bar 22 is pivoted to its alternate, or upraised, position as shown in FIG. 8. With the latch bar 22 in its upraised position the hangers 13 may be quickly and conveniently consolidated by moving the hangers axially along the body member 14 to a centered position and all of the hangers may be then removed from the trolley bar at one time. FIG. 7 illustrates the movement of the hangers 13 along the length of the body member 14 in the foregoing manner.

It is a further feature of the present invention that the latch bar 22 is normally maintained in either its lowered or its upraised position due to the overhanging weight of the other edge member 27 of the latch bar and the eccentric mounting arrangement of the pivot pins 24. In order to keep the overhanging weight of the edge portion 27 from swinging the latch bar 22 past its desired location, each of the supporting brackets 23 is provided with a lower stop 28 and an upper stop 29. As best seen in FIG. 4, the locking edge 26 of the latch bar 22 engages the lower stop 28 when it is disposed in its lowered position with the other edge member 27 projecting outwardly in an overhanging manner. Similarly, when the latch member 22 is moved to its alternate, or upraised position as seen in FIG. 8, the edge member 27 is urged against the upper stop 29 on the end bracket 23 due to the oppositely overhanging weight of the entire latch bar 22.

As previously mentioned, the body member 14 of the illustrative hanger bar 12 is generally circular in cross section with a plurality of axially spaced, generally V-shaped grooves formed therein. It will also be appreciated, however, that other configurations of the elongated body member may also be adopted without departing from the scope of the present invention. One such modification is illustrated in FIG. 9. As shown here, the body member, indicated generally at 14a, comprises an elongated rod 31 on which a plurality of generally cylindrical bead-like members 32 are mounted. In this embodiment the cylindrical portions 32 are formed with tapered ends 33 so that each pair of the members 32 abut one another to define a generally V-shaped groove 21a. It will also be appreciated that while the rod like member 31 is desirably formed of metal in order to provide sufficient strength for the body 14a, the individual cylindrical bead portions 32 can advantageously be formed from a plastic material such as polyethylene, for example. Accordingly, it will be appreciated that the modified version permits certain manufacturing economies to be made in the formation of the trolley bar 12.

From the foregoing, the use and operation of the novel trolley bar 12 should be apparent to one skilled in this art. However, for the sake of completeness, a short resume of the operation will now be given.

To place a plurality of the hangers 13 on the body 14 of the trolley bar 12, it will be understood that the latch bar 22 is first pivoted to its upraised position as shown in FIG. 8. With the latch bar 22 in this position, the edge portion 27 of the bar abuts the stop 29 on the end brackets 23 and the latch bar stays in this position due to its overhanging weight. A consolidated group of the hangers 13 may then be placed on the body member 14 adjacent the center thereof and the individual hangers may then be spread axially along the length of the body so as to fall into the individual grooves 21.

After the hangers 13 are located in the grooves 21, the latch bar 22 can be pivoted down into its lowered position as shown in FIGS. 3 and 4. When the latch bar 22 is in this position, the locking edge 26 of the bar abuts the lower stop 28 on the end bracket 23 due to the overhanging weight of the other edge portion 27 of the bar. The locking edge 26 of the latch bar is then retained in closely spaced position with respect to the surface of the body member 14 to retain the individual hangers 13 in the grooves 21 even when the trolley bar 12 is moved horizontally or along an incline as shown in FIG. 1. When the hangers are to be spread apart for selective inspection or handling, or are to be removed from the trolley bar, the latch bar 22 is, of course, again swung to its upraised position as shown in FIG. 8. The individual hangers 13 may then be moved axially and consolidated adjacent the center of the body member 14 and removed from the trolley 12 singly or in a group. In addition, the articles suspended on the hangers 13 may be quickly and easily separated for inspection, with the adjacent articles well apart, while the hangers remain suspended from the trolley 12; and, of course, the hangers may subsequently be rearranged in their respective spaced apart depressions 21 in the body member 14 for travel along a horizontal or inclined patth.

I claim as my invention:

1. A trolley bar adapted to receive and support a plurality of hooks for movement along a conveyor rail structure comprising, in combination, an elongated body member, means adjacent each end of said body for suspending said body from the rail structure, said body adapted to receive a consolidated group of the hooks and having a plurality of spaced apart depressions formed in the upper surface thereof for initially locating the hooks in spaced apart relation along the length of said body, said depressions being generally V-shaped permitting said consolidated group of hooks to be spread axially along the length of the body member with one hook located in each of said depressions, a bracket member secured to said body member adjacent each end thereof and extending generally upwardly therefrom, a latch bar disposed above said body member and eccentrically pivoted adjacent the ends thereof on said bracket members, said latch bar being swingable from a lowered position whereby one edge thereof is disposed in close proximity to said upper surface of said body member to retain said hooks within said depressions and a raised position whereby said edge is spaced from said upper surface of said body to permit the removal of the hooks from said depressions, and stop means interposed between one of said brackets and said latch bar, said latch bar being placed in an overcentered orientation and adapted to rest against said stop means when in said upraised position.

2. A trolley bar adapted to receive and support a plurality of hooks for movement along a conveyor rail structure comprising, in combination, an elongated body member, means adjacent each end of said body for suspending said body from the rail structure, said body adapted to receive a consolidated group of the hooks and having a plurality of spaced apart depressions formed in the upper surface thereof for initially locating the hooks in spaced apart relation along the length of said body, said depressions being generally V-shaped permitting said consolidated group of hooks to be spread axially along the length of the body member with one hook located in each of said depressions, a bracket member secured to said body member adjacent each end thereof and extending generally upwardly therefrom, a generally L-shaped latch bar having two intersecting edge portions eccentrically pivoted adjacent the ends thereof on said bracket members, said latch bar being disposed above said body member and swingable from a lowered position whereby one edge portion is disposed in close proximity to said surface of said body member to retain said hooks within said depressions and a raised position whereby both of said edge portions are spaced from said upper surface of said body to permit the removal of the hooks from said depressions, and first and second stop means interposed between one of said brackets and said latch bar, said one edge portion adapted to rest against said first stop means due to the overhanging weight of said other edge portion when said latch bar is in said lowered position, and said other edge portion adapted to rest against said second stop means due to the oppositely overhanging weight of said latch bar when in said upraised position.

References Cited by the Examiner

UNITED STATES PATENTS

| 1,728,919 | 9/1929 | Batts | 211—89 |
| 2,708,522 | 5/1955 | Loomis | 211—7 |
| 2,868,389 | 1/1959 | Friend | 211—123 |
| 2,895,618 | 7/1959 | Nathan | 211—123 |
| 2,899,072 | 8/1959 | Weiss | 211—1.5 |

FOREIGN PATENTS 674,836  11/1963  Canada.

CLAUDE A. LE ROY, *Primary Examiner.*

J. F. FOSS, *Assistant Examiner.*